United States Patent
Yoshimoto

(10) Patent No.: US 7,263,549 B2
(45) Date of Patent: Aug. 28, 2007

(54) WEB SYSTEM USING PROXY SERVER MONITORING SERVER AND STORAGE SERVER FOR EFFICIENTLY PROVIDING WEB ACCESS SERVICE TO USERS WITHIN PASSENGER TRANSPORTATION ENVIRONMENT

(75) Inventor: Tetsuro Yoshimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 677 days.

(21) Appl. No.: 10/405,616

(22) Filed: Apr. 3, 2003

(65) Prior Publication Data

US 2003/0200279 A1    Oct. 23, 2003

(30) Foreign Application Priority Data

Apr. 5, 2002    (JP)    ............... 2002-103347

(51) Int. Cl.
*G06F 15/16*    (2006.01)
(52) U.S. Cl. .............. 709/218; 709/219; 709/225
(58) Field of Classification Search ............. 709/218, 709/219, 224, 225, 226, 246, 203, 217, 223; 705/14, 51; 711/120
See application file for complete search history.

(56) References Cited

U.S. PATENT DOCUMENTS

| | | | |
|---|---|---|---|
| 6,487,538 B1* | 11/2002 | Gupta et al. | 705/14 |
| 6,532,493 B1* | 3/2003 | Aviani et al. | 709/224 |
| 2002/0026560 A1* | 2/2002 | Jordan et al. | 711/120 |
| 2002/0052942 A1* | 5/2002 | Swildens et al. | 709/223 |
| 2002/0073167 A1* | 6/2002 | Powell et al. | 709/217 |
| 2003/0004882 A1* | 1/2003 | Holler et al. | 705/51 |
| 2003/0055870 A1* | 3/2003 | Smethers | 709/203 |
| 2004/0049598 A1* | 3/2004 | Tucker et al. | 709/246 |

FOREIGN PATENT DOCUMENTS

JP    A-11-127097    11/1999

* cited by examiner

*Primary Examiner*—Le Hien Luu
(74) *Attorney, Agent, or Firm*—Mattingly, Stanger, Malur & Brundidge, P.C.

(57) ABSTRACT

A method of providing web accessing service and a server apparatus for carrying out the method, wherein access from a user in a LAN to a search engine is monitored, and keyword information is stored. Then, based on the keyword information, the access to the search engine is made again by a web site storage server, and resulting contents of web sites are all stored in the web site storage server.

2 Claims, 4 Drawing Sheets

WEB SYSTEM USING PROXY SERVER MONITORING SERVER AND STORAGE SERVER FOR EFFICIENTLY PROVIDING WEB ACCESS SERVICE TO USERS WITHIN PASSENGER TRANSPORTATION ENVIRONMENT

BACKGROUND OF THE INVENTION

The present invention relates to a system for providing efficient web access from facilities in which a LAN (Local Area Network) including a plurality of users, a comparatively low quality communication line, and a comparatively high quality communication line are interconnected. More specifically, the invention relates to a system for efficiently providing web access within transportation means such as an aircraft or watercraft, or a building that makes a contract for connection to a plurality of lines.

In order to provide web access service to a user within passenger transportation means such as the aircraft or the watercraft, which is not connected to the ground through wired communication or short distance wireless communication, long distance wireless communication is employed.

The bandwidth of the web access through the long distance wireless communication, however, is narrower than the bandwidth of web access through a communication network on the ground, and the web access through the long distance wireless communication costs more than the web access through the communication network on the ground. Accordingly, in order to solve this problem, there is provided means for employing a proxy server for making web access, which has already been used. According to this method, the proxy server is disposed inside the transportation means. Then, by storing the contents of websites accessed by a user in the proxy server, and loading in advance the contents of websites the user could access into the proxy server while the transportation means is on the ground or in port, cheap and comfortable web access is provided to the user, with minimum use of the long distance wireless communication. As an example of employing the proxy server for this purpose, JP-A-11-127097 can be pointed out.

On the other hand, recent advances in a Quality of Service (QoS) guaranteeing technique in the Internet has opened an opportunity for a business for providing a high quality line of a type with a guaranteed communication speed with hourly base charge. Assume that a contract is made for connection to this high quality line for only a predetermined time period, in addition to connection to an always-on low quality connecting line. Then, by downloading web information to the proxy server in advance within a period in which the high quality line can be used, as in the above-mentioned case of the transportation means, it becomes possible for even an office that cannot afford to be always connected to the high quality line to provide cheap and comfortable web access to the user.

When the user desires to obtain detailed information during the web access, it is common practice to use a web site for performing a keyword search, referred to as a search engine. It is the web site that provides a service for listing web site candidates that have information matching a keyword entered on a web page, which plainly indicates information the user desires to know. The user selects among the listed web site candidates a site for obtaining the information and accesses the site. If there are too many candidates listed, another keyword can also be added to narrow the candidates down to fewer one.

In most cases, the contents of web sites loaded into the proxy server in advance in the case of the transportation means are determined from web sites the user often accessed in the past inside the transportation means. Alternatively, the contents of web sites are determined in view of managerial circumstances. Consequently, it often happens that the contents of major web sites are selected of which URLs are known to a lot of user, or the contents of sites that have a tie-up with a company running the transportation business are often selected.

However, it often happens, too, that information that passengers in the transportation means desire to access is detailed information that is not included in the contents of the major web sites though it is orientated in a certain direction. Among such information are detailed route to a place of sojourn and information on good unknown spot for eating and drinking at the place where the user is staying. In order to get to websites having such information according to the purpose of a passenger, more elaborate access is needed. Thus, it often happens that these sites are not selected as information to be loaded into the proxy server. As a result, the number of accesses using the long distance wireless communication will increase, thus leading to losses in terms of both cost and user's convenience.

Further, in the case of a business office as well, information that people engaged in the same business affairs in the office desire to access is frequently the detailed information that is not included in the contents of the major web sites, though it is orientated in a certain direction. Thus, in order to obtain such information, it becomes necessary to make more elaborate access. For this reason, it often happens such information is not selected as information to be loaded into the proxy server.

SUMMARY OF THE INVENTION

In order to solve the problems described above, a method of providing web accessing service for providing Internet web page access to a plurality of users in a LAN according to the present invention includes the steps of:

providing a proxy server connected to the LAN, for enabling communication with the Internet, a monitoring server for monitoring a search condition when one of the users searches for a web page on the Internet, and a storage server for storing web pages on the Internet; and storing the web page in the storage server according to the search condition obtained from the monitoring server and providing by the proxy server the web page stored in the storage server to the user. With this arrangement, web pages having strong possibility of accessing from the user will probably access can be stored in advance using information when the user has searched for the web page. According to this feature of the invention like a cache function, comfortable web access from the users is enabled.

In a typical form of the invention, the proxy server is equipped with first communication means for accessing the Internet and second communication means for accessing the storage server, and the monitoring server acquires a search keyword when a search is performed by a search engine connected to the Internet using the first communication means. The acquired search keyword is transferred to the storage server, and the storage server stores web pages searched according to the search keyword. Then, the web pages stored in the storage server are copied into the proxy server using the second communication means.

In a preferred form of the invention, the second communication means has a higher data transfer rate than the first communication means, or the second communication means has a lower error rate than the first communication means. When the LAN is installed in transportation means, the first communication means often have to be used as major access means because of the high cost of a high quality line. In such a case, by storing web pages searched by using the second communication means, copying the searched web pages into the proxy server, and using the proxy server as a cache when the first communication means is used, high-speed access becomes possible.

Though the LAN may be installed in fixed facilities, it is also effective to install the LAN in the transportation means such as an aircraft or a watercraft. Further, the first communication means may be an always-on connecting line, while the second communication means may be a temporary connecting line.

A server apparatus for providing Internet web page access to a plurality of users using the LAN according to another aspect of the present invention, wherein the server apparatus has a function of communicating with a storage server for storing web pages and a monitoring server for acquiring a search condition when one of the users searches for a web page; and the server apparatus includes:
a first line for accessing the Internet;
a second line for accessing the storage server;
a monitoring server communicating unit for causing the monitoring server to monitor access from the user to the web page through the first line; and
a web information storage unit for receiving the web page stored in the storage server through the second line. It is effective that the second line has a higher transfer rate than the first line, or the second line has a lower error rate than the first line.

As a specific example of the invention, a server for monitoring user access to the search engine in conjunction with the proxy server, acquiring a keyword supplied to the search engine, and storing the keyword is disposed in the transportation means, and while on the ground, a server is disposed for receiving information on the keyword from the server in the transportation means, storing the information on the keyword, accessing the search engine (at the external of the transportation means) based on the information on the keyword, downloading all resulting listed web site information, and loading the information into the proxy server in the transportation means while the transportation means is in port or on the ground.

In a business office, according to the present invention, a server for monitoring user access to the search engine in conjunction with the proxy server, acquiring a keyword supplied to the search engine, and storing the keyword is disposed inside the office, and while outside the office, a server is disposed for receiving information on the keyword from the server inside the office, storing the information on the keyword, accessing the external search engine based on the stored information on the keyword, downloading all resulting listed web site information, and storing the information as information for loading into the proxy server inside the office during a period in which the high quality line can be used.

According to the present invention, detailed information that the user could access can be predicted in advance based on a user search trend in the past, for loading into the proxy server.

Further, the contents of web sites downloaded to the proxy server from the web site storage server in advance can be made to be more substantial than with the conventional art.

Other objects, features and advantages of the invention will become apparent from the following description of the embodiments of the invention taken in conjunction with the accompanying drawings.

DESCRIPTION OF THE EMBODIMENTS

Embodiments of the present invention will be described below with reference to appended drawings.

Figure 1:
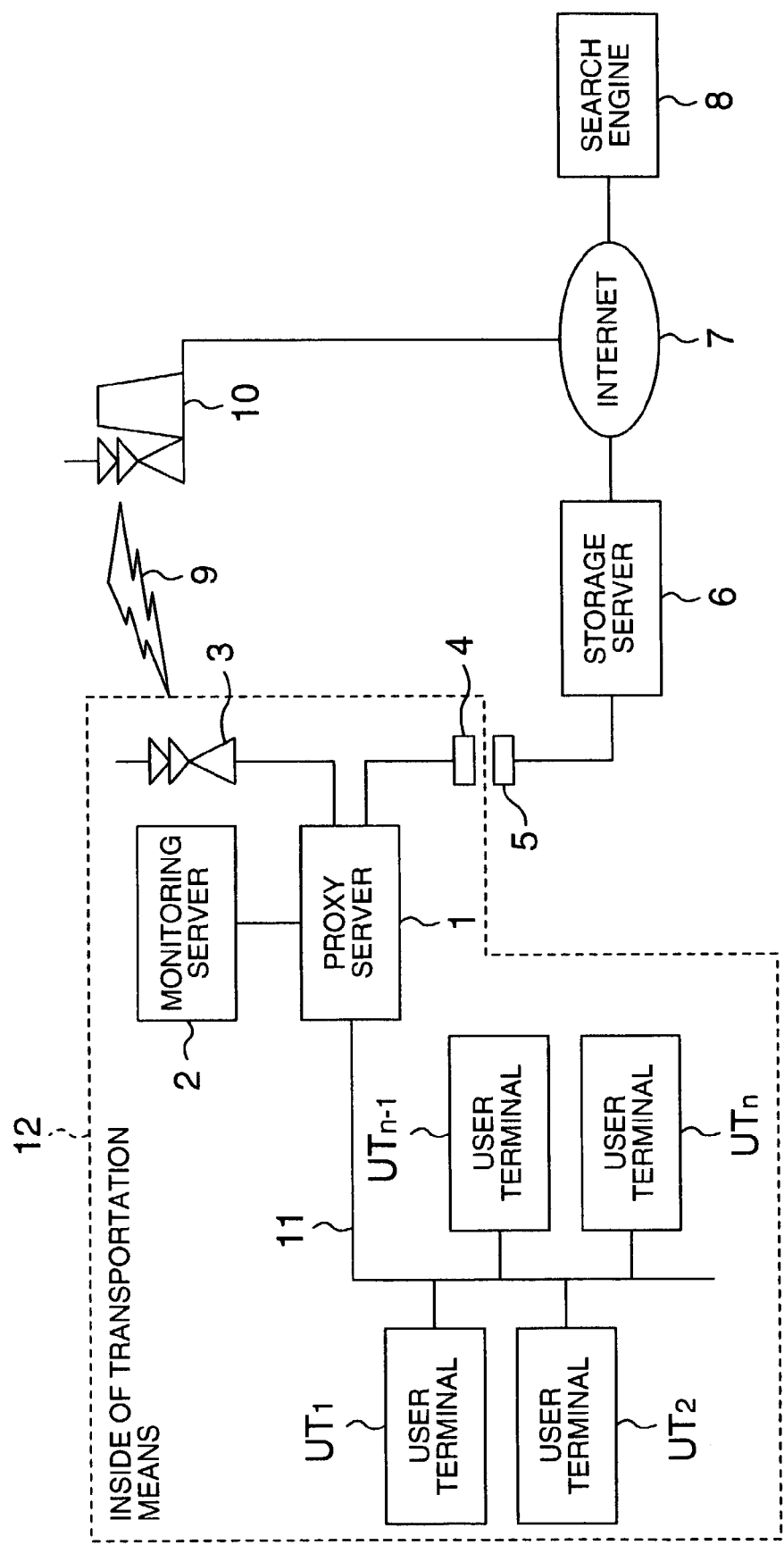
FIG. 1 is a block diagram of a system according to an embodiment of the present invention, employed in transportation means.

FIG. 1 is a block diagram of a system according to the present invention, employed in transportation means 12 such as an aircraft. User terminals UT1 to UTn used by users for web access are connected to a proxy server 1 through LAN facilities 11. A web access request from a user terminal UT is terminated at the proxy server 1 for a time. If the content of a website associated with the web access request has been loaded in the proxy server 1, the content is supplied to the user terminal UT. If the content has not been loaded in the proxy server 1, long distance wireless communication is performed with a base station 10 using an antenna 3, and the content of the web site is acquired through the Internet for supply to the user terminal UT. The content of the web site is also stored in the proxy server 1. Further, while the transportation means 12 is on the ground or in port, the proxy server 1 is connected to a storage server 6 on the ground via connecting units 4 and 5, and downloads the contents of web sites stored in the storage server 6 on the ground. The storage server 6 stores contents data of the web page.

In the present invention, a monitoring server 2 is also connected to the proxy server 1. In cooperation with the proxy server 1, the monitoring server 2 monitors user access to a search engine 8, and stores information on a keyword in its inside. Then, when the transportation means has stopped moving to be on the ground or in port, the monitoring server 1 transmits the information on the keyword to the storage server 6 on the ground. The storage server 6 that has received the information on the keyword accesses the search engine 8, based on the information on the keyword, and then receives a list of web sites associated with the keyword. The search engine 8 may be accessed through the Internet, through an attachment to the storage server 6, or through an Intranet. Then, the storage server 6 receives all or part of the contents of the listed web sites for storage in its inside as information for uploading into the proxy server in the transportation means 12. With this arrangement, information in which the user might be interested can be comprehensively stored in the storage server on the ground in advance.

Figure 2:
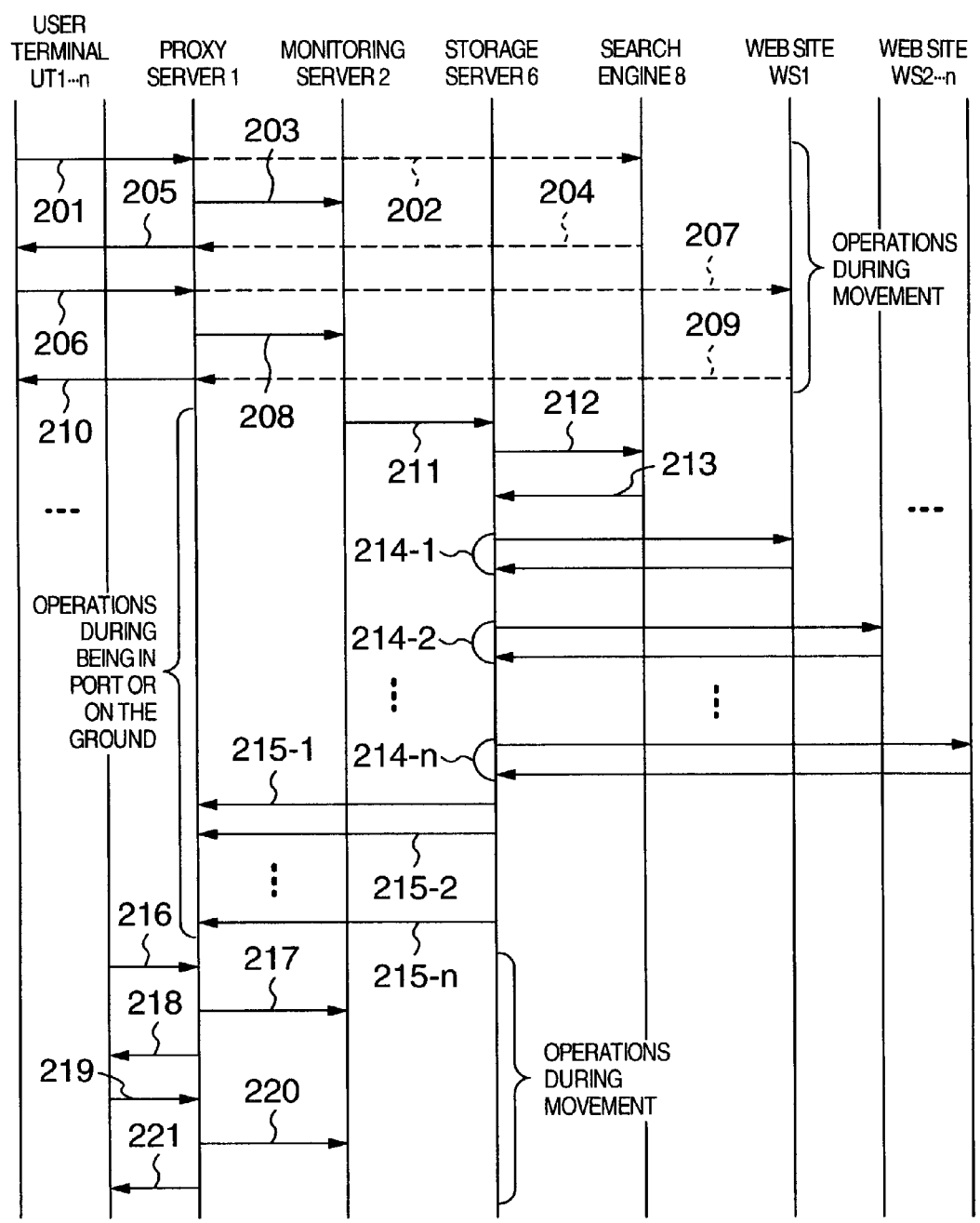
FIG. 2 is a sequence diagram of the system according to an embodiment of the present invention.

FIG. 2 is a sequence diagram showing operations of this system. The behavior of this system will be described in detail with reference to this sequence diagram. Referring to this diagram, a solid-line arrow indicates a broadband access through wired communication or short distance wireless communication, while a dotted-line arrow indicates a narrowband access through the long distance wireless communication.

First, an access request 201 to the search engine 8 is issued from the user terminal UT. Via the proxy server 203, this request becomes an actual access 202 to the search engine 8, and is also sent to the monitoring server 2 in step 203. The monitoring server 2, which has received the access request in step 203, determines whether the access request is made to the search engine 8 or not. If it is determined to be the access request to the search engine 8, the monitoring server 2 stores information on a keyword associated with the access request in its inside.

In step 204, information on a list of web sites from the search engine 8 is transmitted to the proxy server 1 as a response. The proxy server 1 stores the information on the list of the web sites in its inside, and also transfers information on the list to the user terminal UT in step 205.

The user of the user terminal UT selects an arbitrary web site from the list information (a web site WS1 in this case) and issues an access request 206. In this case, too, this request becomes an actual access 207 to the web site WS1 via the proxy server 1, and is also sent to the monitoring server 2 in step 208. Since this is not the access to the search engine 8, the monitoring server 2 does not perform any operation described above.

Information from the web site WS1 is transmitted to the proxy server 1 as a response in step 209. The proxy server 1 stores only a part of the information from the web site WS1 actually accessed by the user in its inside, and also transfers the information to the user terminal UT in step 210.

When the transportation means 12 has stopped moving to be on the ground or in port, the keyword information stored during movement of the transportation means 12 is transferred from the monitoring server 2 to the storage server 6 on the ground in step 211. The storage server 6 on the ground, which has received the keyword information, accesses the search engine 8, based on the keyword information in step 212, and then receives information on a list of web sites associated with the keyword information in step 213. Based on the list, the storage server 6 stores information on all the listed web sites in its inside in steps 214-1 to 214-n. Then, the storage server 6 uploads the information on all the listed web sites to the proxy server 1 in steps 215-1 to 215-n.

When the transportation means 12 has started moving again, the user terminal UT issues an access request to the search engine 8, using the same keyword as that used in the access 201, in step 216. Since the list information is already stored in the proxy server 1, the list information is supplied to the user without using the long distance wireless communication, in step 218. The monitoring server 2 receives the request for the access to the search engine 8 in step 217, and uses the access request for such a purpose as ranking keyword information stored in the monitoring server 2.

The user of the user terminal UT selects a web site from the list and issues an access request to the web site in step 219. Since the information on the web sites included in the list is all stored in the proxy server 1, information on web sites WS2 to WSn as well as the information on the web site WS1 accessed in step 206 can be supplied to the user without using the long distance wireless communication, in step 221. Though the monitoring server 2 receives this access request in step 220, the access request is not aimed at access to the search engine 8, the monitoring server does not perform any operation described above.

Figure 3:
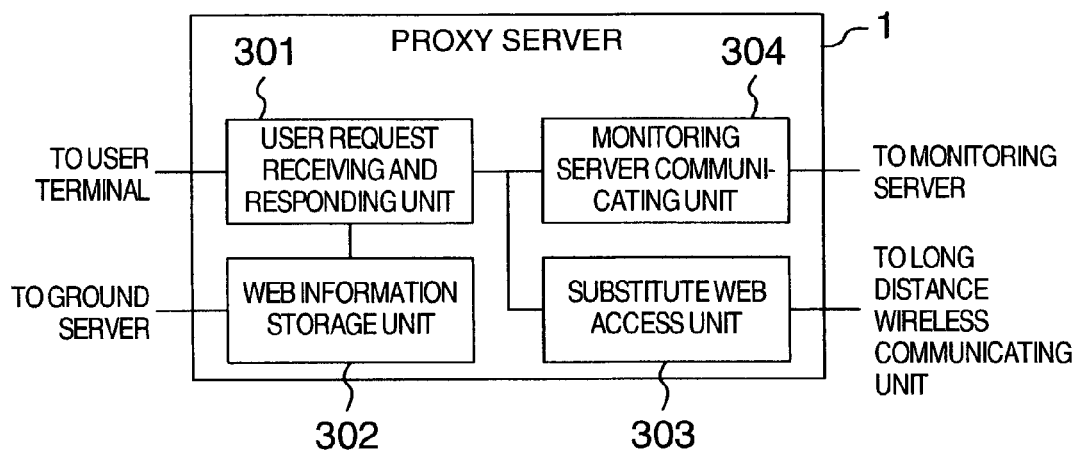
FIG. 3 is a block diagram of software for an example of a proxy server according to the present invention.

FIG. 3 shows an example of the proxy server 1 in this system. Though the proxy server 1 in this example is constituted by software, it may be constituted by hardware having comparable functions. A user request receiving and responding unit 301 has a function as follows: the user request receiving and responding unit 301 receives from a user terminal a request for web connection including access to the search engine 8, and asks a web information storage unit 302 whether web information associated with the web connecting request is stored in the web information storage unit 302. If the web information is stored, the user request receiving and responding unit 301 receives the web information and then sends the web information to the user terminal. If the web information is not stored in the web information storage unit 302, the user request receiving and responding unit 301 requests a substitute web access unit 303 to acquire the web information, receives the web information, and sends the web information to the user terminal. The web information storage unit 302 has a function of passing the user request to a monitoring server communicating unit 304 in parallel with these processes, too.

The web information storage unit 302 has a function as follows: the web information storage unit 302 receives from the user request receiving and responding unit 301 an inquiry whether the web information is stored therein or not. If the web information is stored, the web information storage unit 302 passes the web information to the user request receiving and responding unit 301. If the web information is not stored, the web information storage unit 302 sends to the user request receiving and responding unit 301 a reply indicating that the web information is not stored therein. The web information storage unit 302 has a function of receiving transferred web information from the storage server 6 on the ground for storage therein while the transportation means is on the ground or in port.

The substitute web access unit 303 has a function of acquiring the web information through the Internet, using the long distance wireless communication, and then passing the acquired web information to the user request receiving and responding unit 301.

The monitoring server communicating unit 304 has a function of receiving the user request from the user request receiving and responding unit 301 and then transferring the user request to the monitoring server 2.

Figure 4:
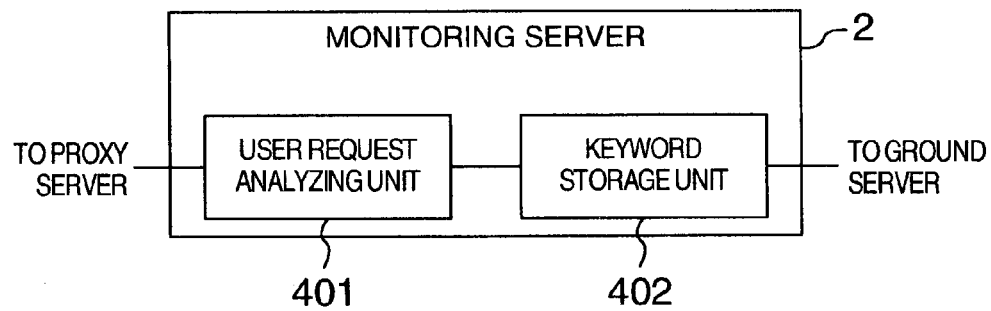
FIG. 4 is a block diagram of software for an example of a monitoring server according to the present invention.

FIG. 4 shows a configuration of an example of software for the monitoring server 2. A user request analyzing unit 401 has a function as follows: the user request analyzing unit 401 receives the request for web connection from the proxy server 1 and analyzes its content. If it has been determined that the request aims at access to the search engine 8, the user request analyzing unit 401 extracts information on a keyword and passes the keyword to a keyword storage unit 402.

The keyword storage unit 402 has a function of storing the keyword received from the user request analyzing unit 401 and transmitting the information on the keyword to the storage server 6 when the transportation means 12 has stopped moving to be on the ground or in port.

Figure 5:
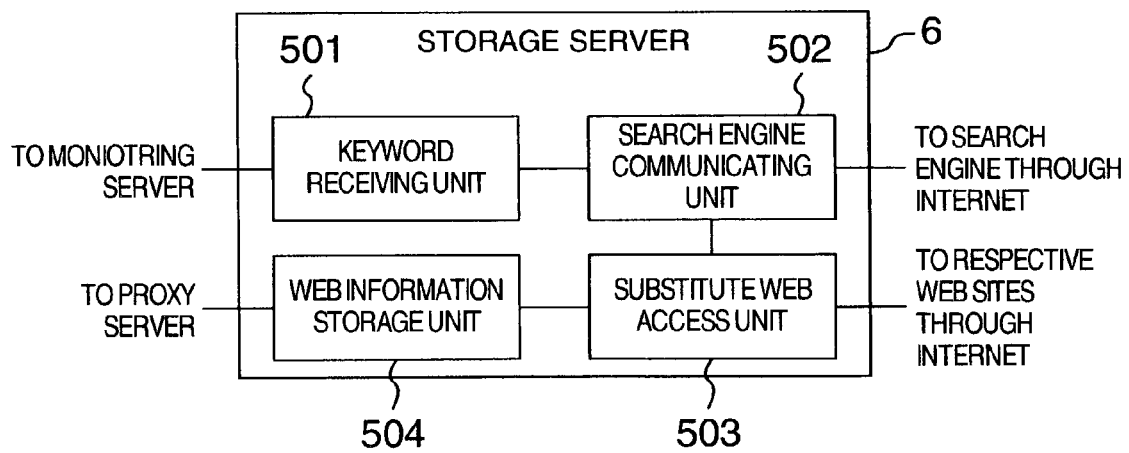
FIG. 5 is a block diagram of software for an example of a web information storage server according to the present invention.

FIG. 5 shows a configuration of software for the storage server 6 on the ground. A keyword receiving unit 501 has a function of receiving the information on the keyword from the monitoring server 2 and then passing the information on the keyword to a search engine communicating unit 502.

The search engine communicating unit 502 has a function of accessing the search engine 8 through the Internet, using the keyword, obtaining a list of web sites associated with the keyword, and then passing the list to a substitute web access unit 503.

The substitute web access unit 503 has a function of accessing all the web sites on the list through the Internet, obtaining information on the web sites, and then passing the information to a web information storage unit 504.

The web information storage unit 504 has a function of transferring the web information stored to the proxy server 1 in the transportation means 12.

If the keyword information is all stored, failures in user search, namely, a failure in discovering a target site due to inappropriate keyword selection, or information on numerous sites discovered is also stored. Thus, user access to a list of the web sites presented by the search engine 8 can also be monitored, and only keywords used when the user actually referenced the listed web sites can also be stored.

In the foregoing description, for simplicity of description, it was assumed that if web information is stored in the proxy server 1, no access using the long distance wireless communication is made. However, update dates of web sites can also be checked using the long distance wireless communication in the same way as the proxy server is commonly used, and if the web sites are updated, information from the web sites can be directly obtained through the long distance wireless communication. Generally, the update dates of the web sites can be checked using much less data than in the case of obtaining information from the web sites. Thus, users convenience will not be affected so much even if the long distance wireless communication is used.

In the foregoing description, the monitoring server and the proxy server are separately provided. The proxy server, however, can also be equipped with the function of the monitoring server, thereby integrating the proxy server and the monitoring server into a single unit.

In the foregoing description, the user and the storage server 6 accessed the same search engine. The storage server 6 may also access another search engine using a keyword stored therein. By accessing a plurality of search engines to obtain a list of web sites, it becomes possible to more comprehensively store in the storage server 6 on the ground information in which the user is interested.

Further, by classifying keywords and data stored in the web site storage server 6 according to the destination of the transportation means, it is also possible to strictly select information to be downloaded to the proxy server, without any loss of information in which the user is interested. The capacity of the storage unit of the proxy server can be thereby reduced.

Still further, it is also possible to integrate the functions of the storage server 6 into the proxy server 1, thereby making the system more compact.

Figure 6:
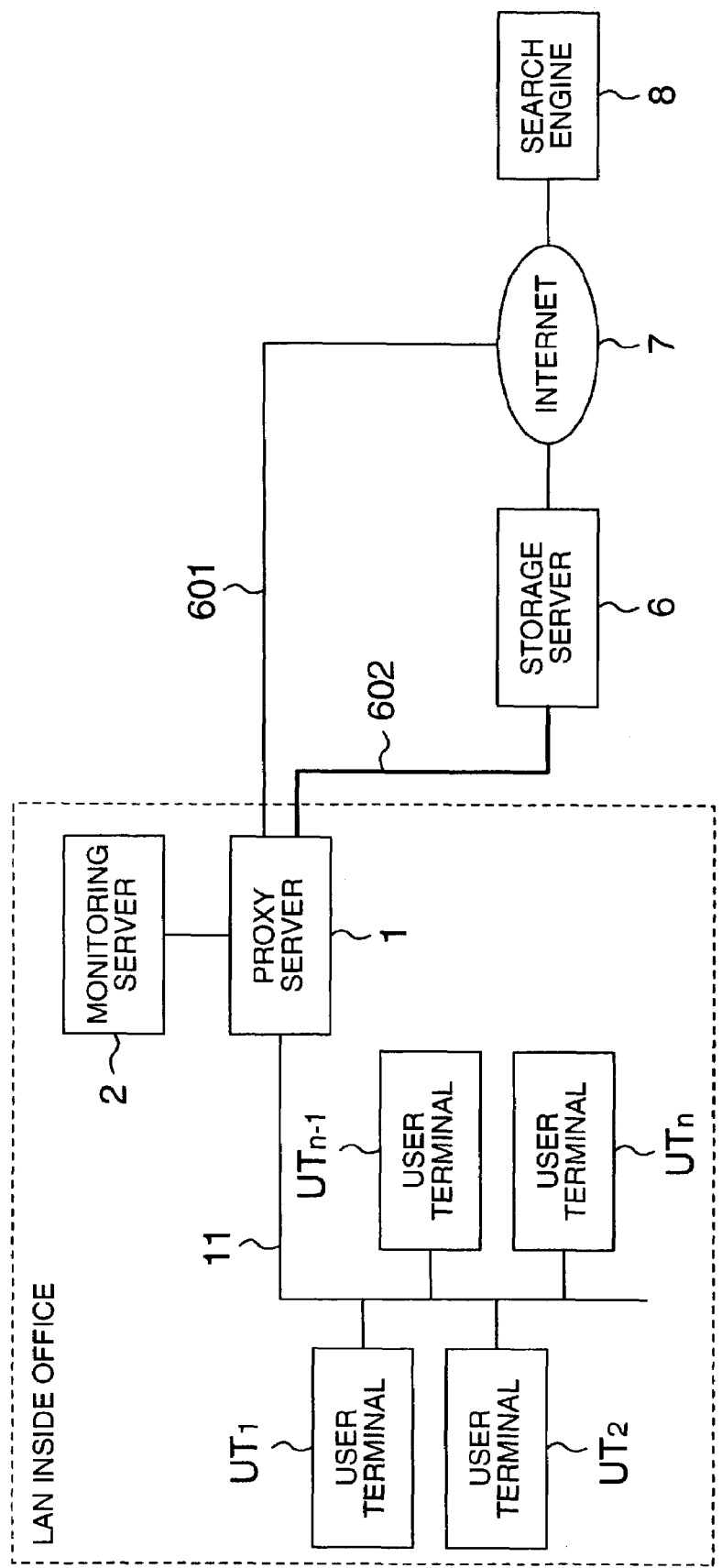
FIG. 6 is a block diagram of the system according to another embodiment of the present invention, employed in an office.

FIG. 6 is a block diagram of the system according to the present invention, employed in an office. The user terminals UT1 to Utn employed by users for making web access are connected to the proxy server 1 through the LAN facilities 11. A web access request from a user terminal UT is terminated at the proxy server 1 for a time. If the content of a website associated with the web access request is loaded in the proxy server 1, the content is supplied to the user terminal UT. If the content is not loaded in the proxy server 1, the content of the web site is acquired through the Internet for supply to the user terminal UT, using an always-on low quality line 601. The content of the web site is also stored in the proxy server 1. Further, during a period in which a high quality line 602 can be used, the proxy server is connected to the storage server 6, and downloads the contents of web sites stored in the storage server 6.

In the present invention, the monitoring server 2 is also connected to the proxy server 1. In cooperation with the proxy server 1, the monitoring server 2 monitors user access to the search engine 8, and stores information on a keyword in its inside. Then, during the period in which the high quality line 602 can be used, the information on the keyword is transmitted to the storage server 6. The storage server 6, which has received the information on the keyword, accesses the search engine 8 based on the information on the keyword and receives a list of websites associated with the keyword. Then, all the contents of the web sites shown on the list are downloaded for storage in the inside of the storage server 6 as information for downloading to the proxy server 1 in the office. With this arrangement, information in which the user is interested can be comprehensively stored in the storage server 6 in advance.

An operation sequence of this system is the same as the one shown in FIG. 2, except that communication through the low quality line is used in place of the long distance wireless communication and communication between the proxy server and the monitoring server is communication through the high quality line.

According to the present invention as described above, the contents of web sites previously downloaded from the storage server 6 to the proxy server 1 can be fuller as compared with the conventional web accessing systems.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of providing web accessing service for providing web access to a plurality of users in transportation means, the method comprising the steps of:

providing the transportation means with a proxy server for performing communication with the users, a monitoring server for monitoring access from one of the users to a search engine and storing a keyword used when the access is made, long distance wireless communication means for making web access while the transportation means is moving, and means for establishing connection to a web page storage server on the ground while the transportation means is in port or on the ground;

providing the web page storage server, means for establishing connection to the proxy server in the transportation means, and means for establishing connection to the Internet, outside the transportation means; and transferring by the monitoring server the keyword obtained by monitoring the access to the search engine from said one of the users in the transportation means to the web page storage server, accessing by the web page storage server the search engine through the Internet using the keyword, downloading by the web page storage server resulting contents of web sites listed, and in the subsequent operation of said transportation means, uploading by the web page storage server the contents of the web sites into the proxy server in the transportation means while the transportation means is in port or on the ground before departures of the transportation means.

2. The method of providing web accessing service for providing Internet web page access to a plurality of users in a LAN, the method comprising the steps of:

providing a proxy server connected to the LAN, for enabling communication with the Internet, a monitoring server for monitoring a search condition when one of the users searches for a web page on the Internet, and a storage server for storing web pages on the Internet;

storing the web page in the storage server according to the search condition obtained from the monitoring server and providing by the proxy server the web page stored in the storage server to said one of the users;

equipping the proxy server with first communication means for accessing the Internet and second communication means for accessing the storage server;

acquiring by the monitoring server a search keyword when the search is performed by a search engine connected to the Internet using the first communication means;

storing by the storage server web pages searched according to the search keyword; and copying the web pages stored in the storage server into the proxy server using the second communication means, wherein information on the search keyword and the contents of the web sites are classified according to a destination of transportation means and downloading prioritization is performed according to the destination of the transportation means.

* * * * *